(12) United States Patent
Termini

(10) Patent No.: US 9,738,181 B1
(45) Date of Patent: Aug. 22, 2017

(54) CONVERTIBLE CAR SEAT, CARRIER AND STROLLER DEVICE

(71) Applicant: Sara Termini, Milton, WI (US)

(72) Inventor: Sara Termini, Milton, WI (US)

(*) Notice: Subject to any disclaimer, the term of this patent is extended or adjusted under 35 U.S.C. 154(b) by 0 days.

(21) Appl. No.: 15/049,654

(22) Filed: Feb. 22, 2016

(51) Int. Cl.
| | | |
|---|---|---|
| *B62B 7/00* | (2006.01) | |
| *B60N 2/28* | (2006.01) | |
| *B62B 7/12* | (2006.01) | |
| *B62B 7/06* | (2006.01) | |
| *B62B 9/08* | (2006.01) | |
| *B62B 9/10* | (2006.01) | |
| *B62B 9/24* | (2006.01) | |
| *B62B 9/20* | (2006.01) | |
| *A47D 13/02* | (2006.01) | |

(52) U.S. Cl.
CPC ......... *B60N 2/2848* (2013.01); *A47D 13/025* (2013.01); *B60N 2/2845* (2013.01); *B60N 2/2881* (2013.01); *B62B 7/06* (2013.01); *B62B 7/12* (2013.01); *B62B 9/085* (2013.01); *B62B 9/108* (2013.01); *B62B 9/20* (2013.01); *B62B 9/24* (2013.01); *B62B 2205/14* (2013.01)

(58) Field of Classification Search
CPC ... B60N 2/2848; B60N 2/2842; B60N 2/2845
See application file for complete search history.

(56) References Cited

U.S. PATENT DOCUMENTS

| | | |
|---|---|---|
| D833,393 | 10/1906 | Inman |
| 5,133,567 A | 7/1992 | Owens |
| 6,367,821 B2 | 4/2002 | Thiele |
| 6,854,744 B2 | 2/2005 | Brandler |
| 6,910,696 B2 | 6/2005 | Bargery |
| D524,560 S | 7/2006 | Berhow et al. |
| 7,273,225 B2 | 9/2007 | Yeh |
| 7,540,507 B1 * | 6/2009 | Kennedy .............. B60N 2/2821 280/30 |
| 2004/0173997 A1 | 9/2004 | Voll |
| 2014/0265255 A1 | 9/2014 | Wang |

* cited by examiner

*Primary Examiner* — Erez Gurari

(57) ABSTRACT

A convertible car seat, carrier and stroller device includes a car seat that has a frame, which is rigid. The car seat is shaped and sized to a child. A handle, which is extendable, is coupled to a back of the frame. A wheel assembly is coupled to and positioned in a housing that is coupled to a bottom of the frame. The wheel assembly is extensible from the housing and operationally coupled to the handle. Extending the handle lowers the wheel assembly and retracting the handle raises the wheel assembly. The car seat is couplable to a base that is configured to couple to an interior of a vehicle. The base is couplable to the interior of a vehicle and positioned to secure the car seat in the vehicle.

12 Claims, 5 Drawing Sheets

CONVERTIBLE CAR SEAT, CARRIER AND STROLLER DEVICE

BACKGROUND OF THE DISCLOSURE

Field of the Disclosure

The disclosure relates to stroller devices and more particularly pertains to a new stroller device that is convertible to a car seat and a carrier.

SUMMARY OF THE DISCLOSURE

An embodiment of the disclosure meets the needs presented above by generally comprising a car seat that has a frame, which is rigid. The car seat is shaped and sized to a child. A handle, which is extendable, is coupled to a back of the frame. A wheel assembly is coupled to and positioned in a housing that is coupled to a bottom of the frame. The wheel assembly is extensible from the housing and operationally coupled to the handle. Extending the handle lowers the wheel assembly and retracting the handle raises the wheel assembly. The car seat is couplable to a base that is configured to couple to an interior of a vehicle. The base is couplable to the interior of a vehicle and positioned to secure the car seat in the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
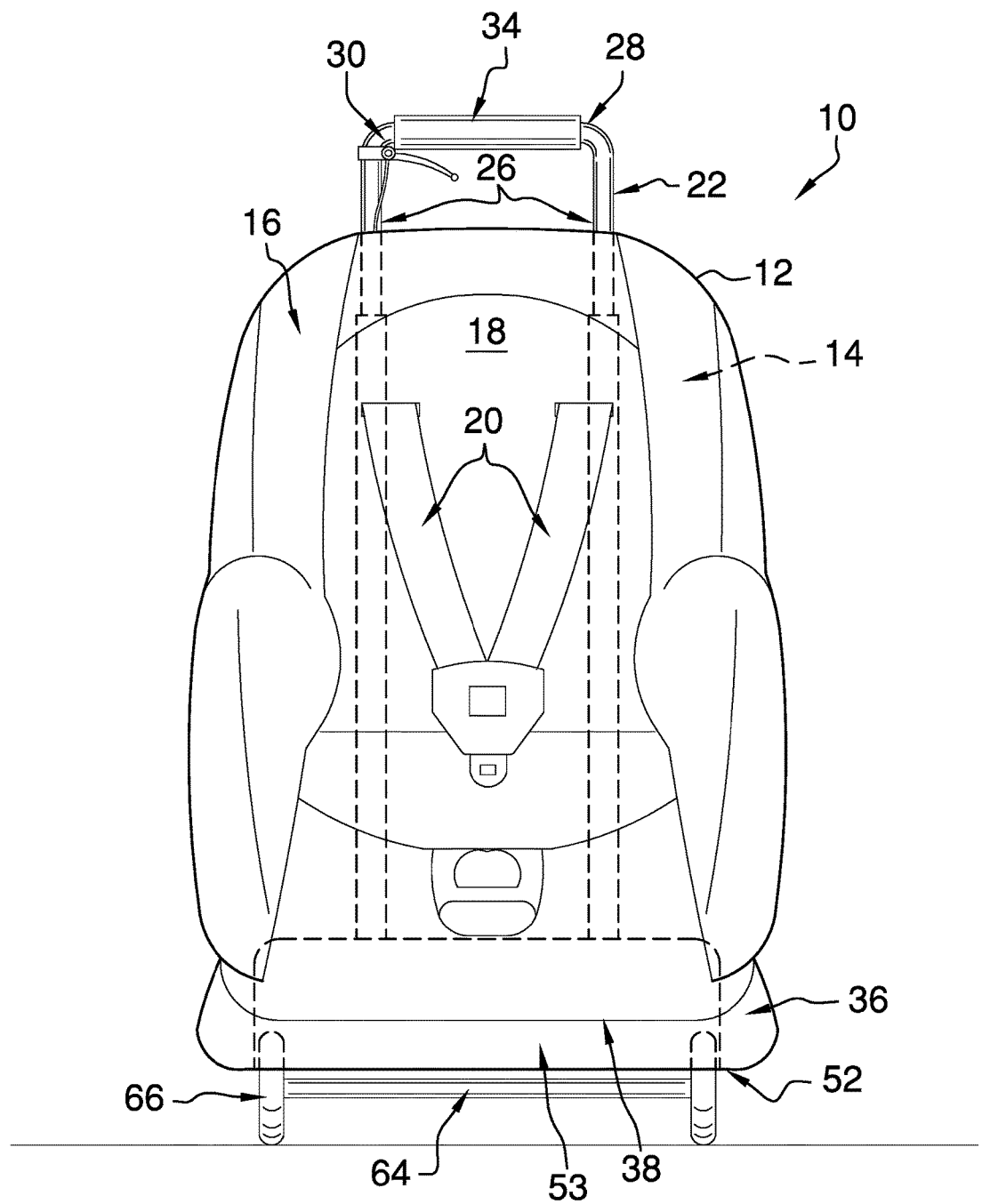
FIG. 1 is a front view of a convertible car seat, carrier and stroller device according to an embodiment of the disclosure.
Figure 2:
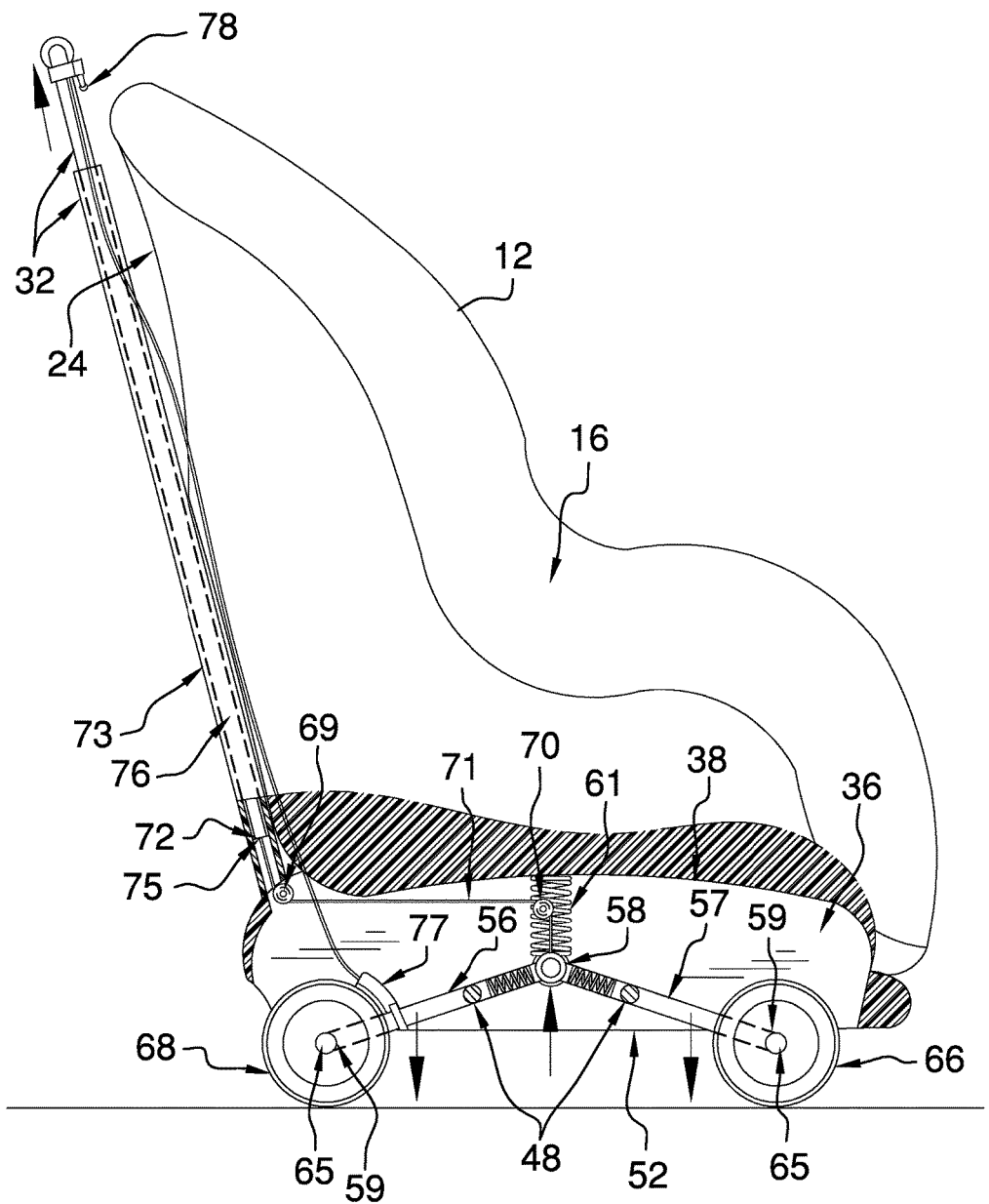
FIG. 2 is a side cross-sectional view of an embodiment of the disclosure.
Figure 3:
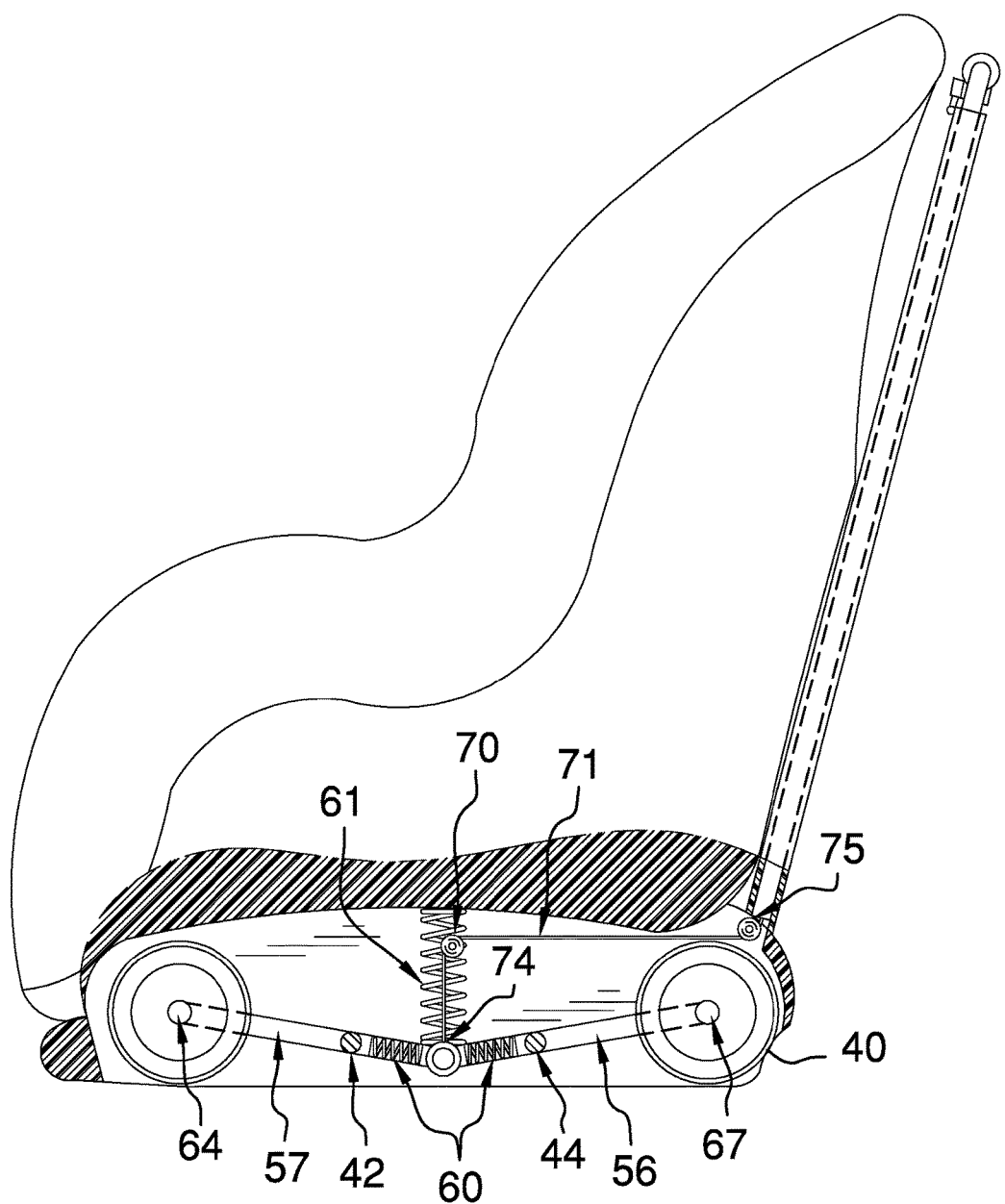
FIG. 3 is a side cross-sectional view of an embodiment of the disclosure.
Figure 4:
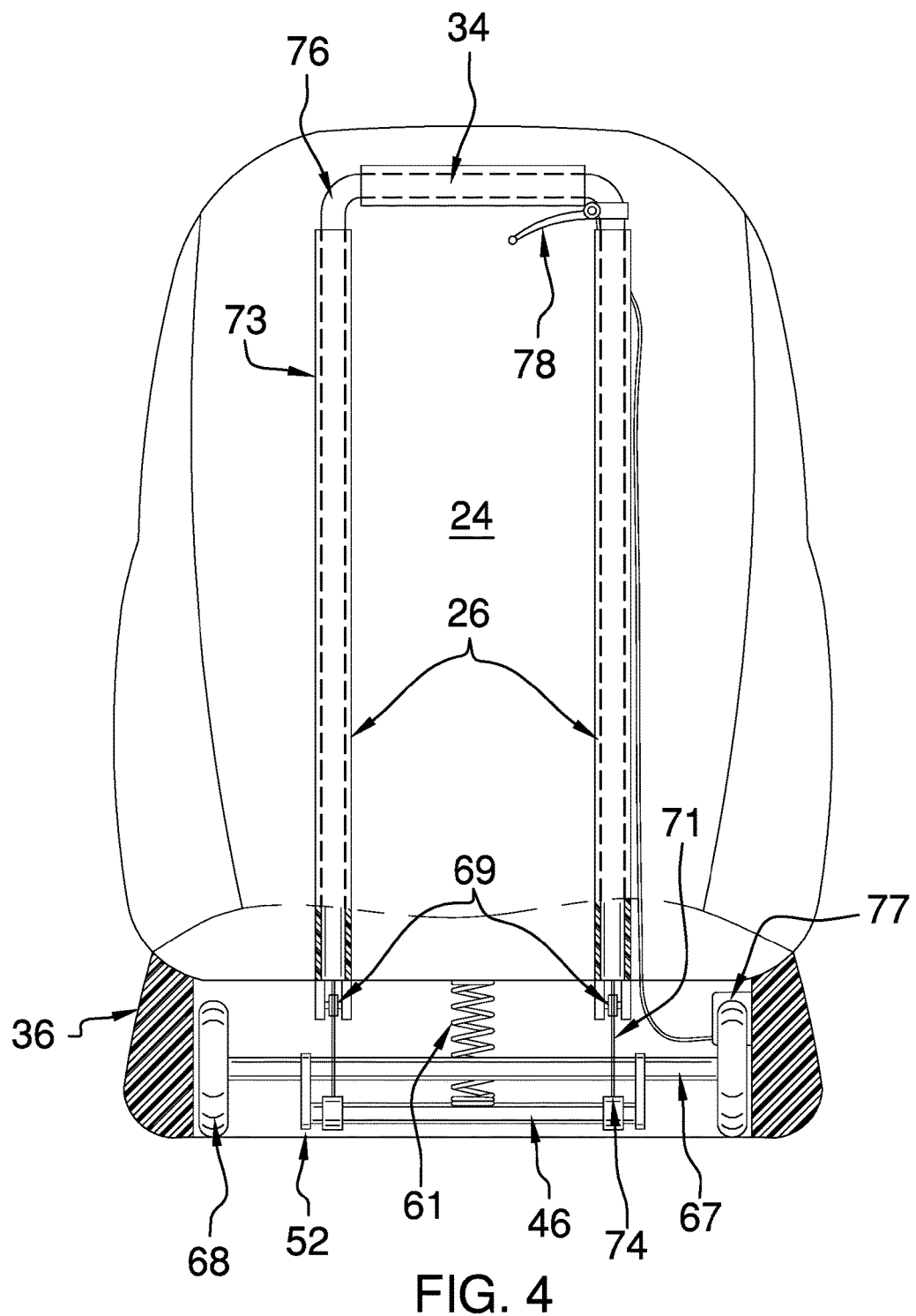
FIG. 4 is a rear cross-sectional view of an embodiment of the disclosure.
Figure 5:
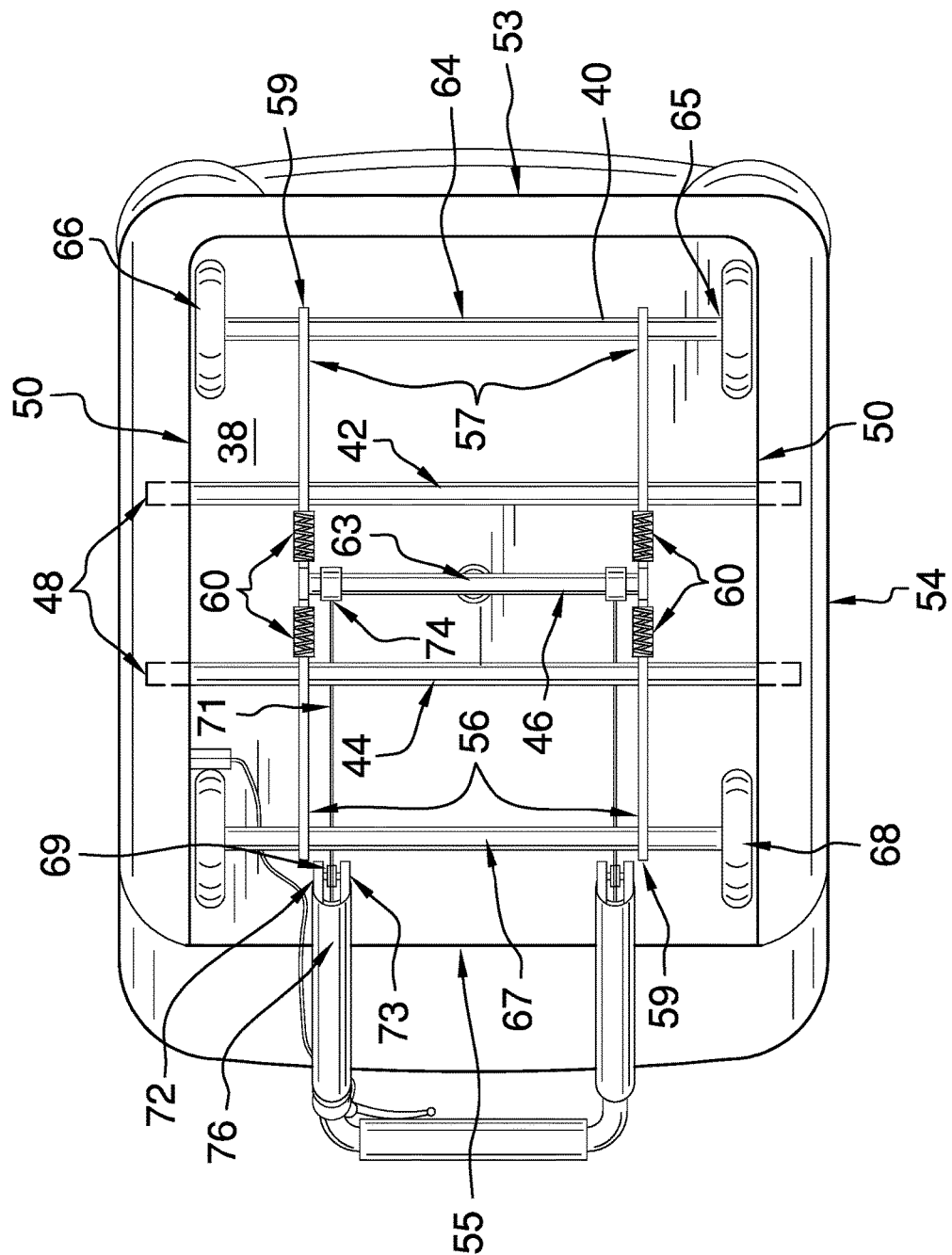
FIG. 5 is a bottom view of an embodiment of the disclosure.

With reference now to the drawings, and in particular to FIGS. 1 through 5 thereof, a new stroller device embodying the principles and concepts of an embodiment of the disclosure and generally designated by the reference numeral 10 will be described.

As best illustrated in FIGS. 1 through 5, the convertible car seat, carrier and stroller device 10 generally comprises a car seat 12 that has a frame 14, which is rigid. The car seat 12 is shaped and sized to fit a child. A cushion 16 is coupled to an interior face 18 of the frame 14. A harness 20 is coupled to the interior face 18 of the frame 14. The harness 20 is configured to secure a child within the frame 14.

A handle 22 is coupled to a back 24 of the frame 14. The handle 22 is extendable and comprises a pair of tubes 26 and a cross member 28. The cross member 28 is coupled to and extends between top ends 30 of the tubes 26. Each tube 26 comprises a plurality of nested sections 32, such that the handle 22 is telescopic. Preferably, each of the pluralities of nested sections 32 comprises two nested sections 32. The cross member 28 may comprise a grip 34. Preferably, the tubes 26 and the cross member 28 are substantially circular when viewed longitudinally.

A housing 36 is coupled to a bottom 38 of the frame 14. A wheel assembly 40 is coupled to and positioned in the housing 36. The wheel assembly 40 is extensible from the housing 36. The wheel assembly 40 is operationally coupled to the handle 22, such that extending the handle 22 lowers the wheel assembly 40 and retracting the handle 22 raises the wheel assembly 40.

More specifically, the wheel assembly 40 comprises a front pivot bar 42, a rear pivot bar 44 and a central pivot bar 46. The front pivot bar 42, the rear pivot bar 44 and the central pivot bar 46 each have opposing ends 48. The central pivot bar 46 is dimensionally shorter than the front pivot bar 42 and the rear pivot bar 44. The front pivot bar 42 and the rear pivot bar 44 are coupled to and extend between opposing sides 50 of the housing 36 proximate to a lower edge 52 of the housing 36. The front pivot bar 42 is positioned substantially equally distant from a front 53 and a midpoint 54 of the housing 36. The rear pivot bar 44 is positioned substantially equally distant from a rear 55 and the midpoint 54 of the housing 36.

The wheel assembly 40 also comprises a pair of rear retraction linkages 56 and a pair of front retraction linkages 57. Each rear retraction linkage 56 and each front retraction linkage 57 has a first end 58 pivotally coupled to a respective opposing end 48 of the central pivot bar 46. Each rear retraction linkage 56 is pivotally coupled to the rear pivot bar 44 proximate to a respective opposing end 48 of the rear pivot bar 44. The rear pivot bar 44 is positioned through a respective rear retraction linkage 56 between the first end 58 and a second end 59 of the respective rear retraction linkage 56. Each front retraction linkage 57 is pivotally coupled to the front pivot bar 42 proximate to a respective opposing end 48 of the front pivot bar 42. The front pivot bar 42 is positioned through a respective front retraction linkage 57 between the first end 58 and a second end 59 of the respective front retraction linkage 57.

The first ends 58 of the rear retraction linkages 56 and the front retraction linkages 57 comprise springs 60. The central pivot bar 46 is positionable below the front pivot bar 42 and the rear pivot bar 44, such that the wheel assembly 40 is in a stowed position. The springs 60 allow the front retraction linkages 57 and the rear retraction linkages 56 to pivot, such that the central pivot bar 46 is positionable above the front pivot bar 42 and the rear pivot bar 44, therein extending the wheel assembly 40 from the housing 36. A compression spring 61 is coupled to and extends between the central pivot bar 46 proximate to a center 63 of the central pivot bar 46 and the bottom 38 of the frame 14.

A front axle 64 is rotationally coupled to the second ends 59 of the front retraction linkages 57. Each of opposing termini 65 of the front axle 64 is coupled to a respective front wheel 66. A rear axle 67 is rotationally coupled to the second ends 59 of the rear retraction linkages 56. Each of the opposing termini 65 of the rear axle 67 is coupled to a respective rear wheel 68.

The device 10 comprises a pair of first pulleys 69, a pair of second pulleys 70 and a pair of cables 71. Each first pulley 69 is coupled to a bottom end 72 of a respective lowermost nested section 73 of the handle 22. Each second pulley 70 is coupled to the bottom 38 of the frame 14 in substantial vertical alignment with a respective opposing end 48 of the central pivot bar 46. Each cable 71 has a first terminus 74 and a second terminus 75. The first terminus 74 is coupled to the central pivot bar 46 proximate to a respective opposing end 48 of the central pivot bar 46. The second terminus 75 is coupled to a respective uppermost nested section 76 of the handle 22. Each cable 71 extends from the central pivot bar 46 over and around a respective second pulley 70. The cable 71 extends from the respective second pulley 70 under and around a respective first pulley 69 to the respective uppermost nested section 76. Extension of the handle 22 motivates compression of the compression spring 61 to lower the front wheels 66 and the rear wheels 67 from the housing 36.

A brake 77 is operationally coupled to the wheel assembly 40. Preferably, the brake 77 is coupled to a respective rear retraction linkage 56 proximate to a respective rear wheel 68. The brake 77 is positioned to frictionally couple to the respective rear wheel 68. A lever 78 is pivotally coupled to the handle 22 and operationally coupled to the brake 77. The lever 78 is positioned to be pivoted such that the brake 77 is motivated to lock the wheel assembly 40. Preferably, the lever 78 is coupled to a respective tube 26 of the handle 22 proximate to the cross member 28.

The device 10 also comprises a base 79 that is configured to couple to an interior of a vehicle. The car seat 12 is couplable to the base 79, such that the base 79 is positioned to secure the car seat 12 in the vehicle.

In use, the base 79 is couplable to the interior of a vehicle, and the car seat 12 is couplable to the base 79 to secure the car seat 12 to the vehicle. The car seat 12 is removable from the base 79 to be carried. The wheel assembly 40 is positioned to be lowered from the housing 36 upon extension of the handle 22, such that the car seat 12 is rollable upon the wheel assembly 40. The lever 78 is positioned on the handle 22 to engage the brake 77, such that the wheel assembly 40 is lockable.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A convertible car seat, carrier and stroller device comprising:
 a car seat, said car seat having a frame, said frame being rigid, said car seat being shaped and sized for a child;
 a handle, said handle being coupled to a back of said frame, said handle being extendable;
 a housing, said housing being coupled to a bottom of said frame;
 a wheel assembly, said wheel assembly being coupled to and positioned in said housing, said wheel assembly being extensible from said housing, said wheel assembly being operationally coupled to said handle, such that extending said handle lowers said wheel assembly and wherein retracting said handle raises said wheel assembly, said wheel assembly comprising
  a front pivot bar, a rear pivot bar and a central pivot bar, said front pivot bar, said rear pivot bar and said central pivot bar each having opposing ends, said central pivot bar being dimensionally shorter than said front pivot bar and said rear pivot bar, said front pivot bar and said rear pivot bar being coupled to and extending between opposing sides of said housing proximate to a lower edge of said housing, said front pivot bar being positioned substantially equally distant from a front and a midpoint of said housing, said rear pivot bar being positioned substantially equally distant from a rear and said midpoint of said housing,
  a pair of rear retraction linkages and a pair of front retraction linkages, each said rear retraction linkage and each said front retraction linkage having a first end pivotally coupled to a respective said opposing end of said central pivot bar, each said rear retraction linkage being pivotally coupled to said rear pivot bar proximate to a respective said opposing end of said rear pivot bar, said rear pivot bar being positioned through a respective said rear retraction linkage between said first end and a second end of said respective said rear retraction linkage, each said front retraction linkage being pivotally coupled to said front pivot bar proximate to a respective said opposing end of said front pivot bar, said front pivot bar being positioned through a respective said front retraction linkage between said first end and a second end of said respective said front retraction linkage, said first ends of said rear retraction linkages and said front retraction linkages comprising springs, such that said central pivot bar is positionable below said front pivot bar and said rear pivot bar and wherein said front retraction linkage and said rear retraction linkage are pivotable to position said central pivot bar above said front pivot bar and said rear pivot bar,
  a compression spring, said compression spring being coupled to and extending between said central pivot bar proximate to a center of said central pivot bar and said bottom of said frame,
  a front axle, said front axle being rotationally coupled to said second ends of said front retraction linkages, each of opposing termini of said front axle being coupled to a respective front wheel, and
  a rear axle, said rear axle being rotationally coupled to said second ends of said rear retraction linkages, each of opposing termini of said rear axle being coupled to a respective rear wheel; and a base, said car seat being couplable to said base, said base being configured to couple to an interior of a vehicle, wherein said base is couplable to the interior of a vehicle and positioned to secure said car seat in the vehicle.

2. The device of claim 1, further comprising:
a brake, said brake being operationally coupled to said wheel assembly;
a lever, said lever being pivotally coupled to said handle, said lever being operationally coupled to said brake, wherein said lever is positioned to be pivoted such that said brake is motivated to lock said wheel assembly.

3. The device of claim 1, further including a cushion, said cushion being coupled to an interior face of said frame.

4. The device of claim 1, further including a harness, said harness being coupled to said interior face of said frame, wherein said harness is configured to secure a child within said frame.

5. The device of claim 1, further including said handle comprising a pair of tubes and a cross member, said cross member being coupled to and extending between top ends of said tubes.

6. The device of claim 5, further including said tubes comprising pluralities of nested sections, such that said handle is telescopic.

7. The device of claim 6, further including each of said pluralities of nested sections comprising two nested sections.

8. The device of claim 5, further including said cross member comprising a grip.

9. The device of claim 5, further including said tubes and said cross member being substantially circular when viewed longitudinally.

10. The device of claim 1, further comprising:
a pair of first pulleys, each said first pulley being coupled to a bottom end of a respective lowermost nested section of said handle;
a pair of second pulleys, each said second pulley being coupled to said bottom of said frame, each said second pulley being in substantial vertical alignment with a respective said opposing end of said central pivot bar;
a pair of cables, each said cable having a first terminus and a second terminus, said first terminus being coupled to said central pivot bar proximate to a respective said opposing end of said central pivot bar, said second terminus being coupled to a respective uppermost nested section of said handle, each said cable extending from said central pivot bar over and around a respective said second pulley, said cable extending from said respective said second pulley under and around a respective said first pulley to said respective said uppermost nested section; and
wherein extension of said handle motivates compression of said compression spring to lower said front wheels and said rear wheels from said housing.

11. The device of claim 1, further comprising:
said handle comprising a pair of tubes and a cross member, said cross member being coupled to and extending between top ends of said tubes;
a brake, said brake being coupled to a respective said rear retraction linkage proximate to a respective said rear wheel, such that said brake is positioned to frictionally couple to said respective said rear wheel; and
a lever, said lever being operationally coupled to said brake, said lever being pivotally coupled to a respective said tube proximate to said cross member.

12. A convertible car seat, carrier and stroller device comprising:
a car seat, said car seat having a frame, said frame being rigid, said car seat being shaped and sized for a child;
a cushion, said cushion being coupled to an interior face of said frame;
a harness, said harness being coupled to said interior face of said frame, wherein said harness is configured to secure a child within said frame;
a handle, said handle being coupled to a back of said frame, said handle being extendable, said handle comprising a pair of tubes and a cross member, said cross member being coupled to and extending between top ends of said tubes, said tubes comprising pluralities of nested sections, such that said handle is telescopic, each of said pluralities of nested sections comprising two nested sections, said cross member comprising a grip, said tubes and said cross member being substantially circular when viewed longitudinally;
a housing, said housing being coupled to a bottom of said frame;
a wheel assembly, said wheel assembly being coupled to and positioned in said housing, said wheel assembly being extensible from said housing, said wheel assembly being operationally coupled to said handle, such that extending said handle lowers said wheel assembly and wherein retracting said handle raises said wheel assembly, said wheel assembly comprising:
a front pivot bar, a rear pivot bar and a central pivot bar, said front pivot bar, said rear pivot bar and said central pivot bar each having opposing ends, said central pivot bar being dimensionally shorter than said front pivot bar and said rear pivot bar, said front pivot bar and said rear pivot bar being coupled to and extending between opposing sides of said housing proximate to a lower edge of said housing, said front pivot bar being positioned substantially equally distant from a front and a midpoint of said housing, said rear pivot bar being positioned substantially equally distant from a rear and said midpoint of said housing,
a pair of rear retraction linkages and a pair of front retraction linkages, each said rear retraction linkage and each said front retraction linkage having a first end pivotally coupled to a respective said opposing end of said central pivot bar, each said rear retraction linkage being pivotally coupled to said rear pivot bar proximate to a respective said opposing end of said rear pivot bar, said rear pivot bar being positioned through a respective said rear retraction linkage between said first end and a second end of said respective said rear retraction linkage, each said front retraction linkage being pivotally coupled to said front pivot bar proximate to a respective said opposing end of said front pivot bar, said front pivot bar being positioned through a respective said front retraction linkage between said first end and a second end of said respective said front retraction linkage,
said first ends of said rear retraction linkages and said front retraction linkages comprising springs, such that said central pivot bar is positionable below said front pivot bar and said rear pivot bar and wherein said front retraction linkage and said rear retraction linkage are pivotable to position said central pivot bar above said front pivot bar and said rear pivot bar,
a compression spring, said compression spring being coupled to and extending between said central pivot bar proximate to a center of said central pivot bar and said bottom of said frame, a front axle, said front axle being rotationally coupled to said second ends of said front retraction linkages, each of opposing termini of said front axle being coupled to a respective front wheel, and a rear axle, said rear axle being rotationally coupled to said second ends of said rear retraction linkages, each of opposing termini of said rear axle being coupled to a respective rear wheel;

a pair of first pulleys, each said first pulley being coupled to a bottom end of a respective lowermost nested section of said handle;

a pair of second pulleys, each said second pulley being coupled to said bottom of said frame, each said second pulley being in substantial vertical alignment with a respective said opposing end of said central pivot bar;

a pair of cables, each said cable having a first terminus and a second terminus, said first terminus being coupled to said central pivot bar proximate to a respective said opposing end of said central pivot bar, said second terminus being coupled to a respective uppermost nested section of said handle, each said cable extending from said central pivot bar over and around a respective said second pulley, said cable extending from said respective said second pulley under and around a respective said first pulley to said respective said uppermost nested section, wherein extension of said handle motivates compression of said compression spring to lower said front wheels and said rear wheels from said housing;

a brake, said brake being operationally coupled to said wheel assembly, said brake being coupled to a respective said rear retraction linkage proximate to a respective said rear wheel, such that said brake is positioned to frictionally couple to said respective said rear wheel;

a lever, said lever being pivotally coupled to said handle, said lever being operationally coupled to said brake, wherein said lever is positioned to be pivoted such that said brake is motivated to lock said wheel assembly, said lever being coupled to a respective tube of said handle proximate to said cross member; and a base, said car seat being couplable to said base, said base being configured to couple to an interior of a vehicle, wherein said base is couplable to the interior of a vehicle and positioned to secure said car seat in the vehicle.

\* \* \* \* \*